US012592227B2

(12) United States Patent (10) Patent No.: US 12,592,227 B2
Gomez et al. (45) Date of Patent: Mar. 31, 2026

(54) DIALOG UNDERSTANDING DEVICE AND DIALOG UNDERSTANDING METHOD

(71) Applicant: HONDA MOTOR CO., LTD., Tokyo (JP)

(72) Inventors: Randy Gomez, Wako (JP); Eric Nichols, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 18/442,239

(22) Filed: Feb. 15, 2024

(65) Prior Publication Data

US 2024/0282297 A1 Aug. 22, 2024

(51) Int. Cl.
*G10L 15/18* (2013.01)
*G10L 15/06* (2013.01)
*G10L 15/183* (2013.01)
*G10L 15/22* (2006.01)
*G10L 15/08* (2006.01)

(52) U.S. Cl.
CPC ........ *G10L 15/1815* (2013.01); *G10L 15/063* (2013.01); *G10L 15/183* (2013.01); *G10L 15/22* (2013.01); *G10L 2015/088* (2013.01)

(58) Field of Classification Search
USPC ............... 704/235, 246, 247, 251, 252, 275
See application file for complete search history.

(56) References Cited

U.S. PATENT DOCUMENTS

| | | | | |
|---|---|---|---|---|
| 11,329,933 | B1* | 5/2022 | Kiyanda | ................. H04L 51/02 |
| 2016/0055240 | A1* | 2/2016 | Tur | ........................ G06F 40/284 |
| | | | | 707/706 |
| 2016/0188565 | A1* | 6/2016 | Robichaud | .............. G06F 40/35 |
| | | | | 704/9 |
| 2017/0113353 | A1* | 4/2017 | Monceaux | .............. G10L 15/22 |
| 2023/0306967 | A1* | 9/2023 | Lopes Torrao | ..... G10L 15/1815 |

FOREIGN PATENT DOCUMENTS

JP      2019-084598      6/2019

* cited by examiner

*Primary Examiner* — Leonard Saint-Cyr
(74) *Attorney, Agent, or Firm* — Amin, Turocy & Watson, LLP

(57) ABSTRACT

A dialog understanding device includes a sound collection module configured to collect a sound signal, a contextual processing module, and a dialog system configured to perform a dialog with a human. The contextual processing module includes a plurality of layers for processing information obtained from the sound collection module. A fallback processing module of a case where a predetermined process has not succeeded for the collected sound signal is provided on each layer of the plurality of layers. A process of the next layer is performed after a fallback corresponding to a fallback process performed by the fallback processing module is performed. A sound signal obtained when the contextual processing module completes a process is input to the dialog system.

6 Claims, 13 Drawing Sheets

FIG. 11

| FALLBACK NUMBER | FALLBACK DESCRIPTION | LEVEL 1: BASIC SANITY CHECKS |
| --- | --- | --- |
| | | SYSTEM PROMPT, SPECIFIC ACTIONS AND OTHER DETAILS |
| FALLBACK 1 | IGNORE AUDIO INPUTS UNTIL WAKE-UP WORD IS DETECTED FALLBACK | SYSTEM SHALL IGNORE ALL SPEECH INPUTS APART FROM THE PREDETERMINED WAKE UP WORDS. |
| FALLBACK 2 | IGNORE AUDIO AS NOISE IF NO SPATIAL MATCH WITH A PERSON IS FOUND | SYSTEM SHALL IGNORE ALL SPEECH INPUTS AS NOISE IF IT CAN NOT ASCERTAIN THAT THE SOUND ORIGINATED FROM A DIRECTION WHERE A HUMAN IS CURRENTLY PRESENT. HUMANS SHALL BE TRACKED USING A DEDICATED SKELETON TRACKING DEPTH CAMERA OR BY OTHER MEANS. |
| FALLBACK 3 | IGNORE AUDIO AS NOISE IF NO MOUTH MOVEMENT HAS BEEN DETECTED | SYSTEM SHALL IGNORE ALL SPEECH INPUTS FROM A CERTAIN PERSON AS BACKGROUND NOISE IF IT CAN 'SEE' THEIR FACE AND NO MOUTH MOVEMENT HAS BEEN DETECTED. THIS APPROACH MAKES THE SYSTEM ROBUST TO BACKGROUND NOISE COMING FROM BEHIND THE PERSON. |
| FALLBACK 4 | IGNORE AUDIO AS NOISE IF SPEAKER IS LOOKING AT SOMEONE ELSE OR NOT AT THE ROBOT | SYSTEM SHALL IGNORE ALL SPEECH INPUTS FROM A CERTAIN PERSON IF IT CAN SPATIALLY ASCERTAIN THAT THE SPEAKER IS TALKING TO SOMEONE ELSE, LIKE ANOTHER PERSON IN THE ROOM. |

FIG. 12

| FALLBACK NUMBER | FALLBACK DESCRIPTION | LEVEL 2: SPEECH TO TEXT SANITY CHECKS |
| --- | --- | --- |
| | | SYSTEM PROMPT, SPECIFIC ACTIONS AND OTHER DETAILS |
| FALLBACK 1 | IGNORE AUDIO INPUTS AS NOISE IF NO TRANSCRIPTION RESULTS ARE GENERATED | SYSTEM SHALL IGNORE ALL SPEECH INPUTS WHICH DO NOT GENERATE VALID TRANSCRIBED TEXT AS NOISE. |
| FALLBACK 2 | SPECIFIC REACTION TO THE CHANGE OF SPEAKER, IF DETECTED | IF A SPEAKER CHANGES, THE SYSTEM SHALL ACKNOWLEDGE THAT IT HAS DETECTED THIS. FOR EXAMPLE, IT CAN "FACE" THE NEW SPEAKER OR ADD SOMETHING LIKE "NICE TO HEAR YOUR INPUT AS WELL." TO THE GENERATED REPLY. |
| FALLBACK 3 | DYNAMICALLY SWITCH LANGUAGES IF LANGUAGE IS SUPPORTED | INSTEAD OF RESORTING TO DEFAULT FALLBACK, THE SYSTEM SHOULD BE ABLE TO HANDLE A SPEAKER SWITCHING LANGUAGES BETWEEN SPEECH INPUTS. SUCH EVENT CAN BE ACKNOWLEDGED BY A PHRASE IN THE PREVIOUS LANGUAGE, EXAMPLE: "OH, YOU WANT TO SWITCH TO SPANISH NOW? SURE, I CAN DO THAT." |
| FALLBACK 4 | INFORM THE SPEAKER IF SPEAKING IN UNSUPPORTED LANGUAGE | THE SYSTEM SHOULD BE ABLE TO DETECT IF THE SPEAKER IS USING A LANGUAGE THAT IS NOT SUPPORTED AND SUGGEST A SWITCH TO A SUPPORTED LANGUAGE. |

FIG. 13

| FALLBACK NUMBER | FALLBACK DESCRIPTION | LEVEL 3: SENTENCE ANALYSIS |
| --- | --- | --- |
| | | SYSTEM PROMPT, SPECIFIC ACTIONS AND OTHER DETAILS |
| FALLBACK 1 | INSERT SPECIFIC REACTION IS STATEMENT WAS EXPECTED BUT QUESTION WAS RECEIVED (AND VICE VERSA) | IF A SYSTEM EXPECTED A STATEMENT FROM THE SPEAKER BUT INSTEAD RECEIVED A QUESTION. PERHAPS THE SYSTEM CAN NUDGE THE SPEAKER TO ANSWER THE QUESTION. |
| FALLBACK 2 | ASK A FOLLOW-UP QUESTION IF A REQUIRED ENTITY WAS NOT DETECTED IN SPEAKER'S SENTENCE | IF THE SYSTEM'S INTENTION WAS TO UNDERSTAND THE VALUE OF AN ENTITY TYPE AND THAT VALUE IS REQUIRED TO CONTINUE THE CONVERSATION. THEN THE SYSTEM SHALL ASK A FOLLOW-UP QUESTION TO TRY TO EXTRACT THE MISSING ENTITY. |

DIALOG UNDERSTANDING DEVICE AND DIALOG UNDERSTANDING METHOD

CROSS-REFERENCE TO RELATED APPLICATION

Priority is claimed on Japanese Patent Application No. 2023-026245, filed Feb. 22, 2023, the content of which is incorporated herein by reference.

BACKGROUND OF THE INVENTION

Field of the Invention

The present invention relates to a dialog understanding device and a dialog understanding method.

Description of Related Art

In recent years, robots and devices, which provide voice commands and communicate with users by voice, have been developed. A dialog system, which is a sound command processing system, is significantly effective when communicating with a robot. Thereby, the robot can understand a command and appropriately execute the command. Such a dialog system uses text data obtained from speech recognition results. In the dialog system, for example, a plurality of scenarios for the assumed dialog are provided and a dialog is performed on the basis of a scenario (see, for example, the following Patent Document 1).

[Patent Document 1] Japanese Unexamined Patent Application, First Publication No. 2019-84598

SUMMARY OF THE INVENTION

However, in the conventional technology, a dialog system may not suitably function in a case where a conversation deviates from a scenario, a case where the content of a speaker's utterances is not structured as expected, or the like. For example, if the hypothesis is corrupted or the other person's conversation style does not fit the structure of a dialog input, the dialog system does not suitably function.

An aspect according to the present invention is made in view of the above problems and an objective of the present invention is to provide a dialog understanding device and a dialog understanding method capable of detecting an abnormality that is likely to corrupt an input to a dialog system.

To achieve the objective by solving the above problems, the present invention adopts the following aspects.

(1) According to an aspect of the present invention, there is provided a dialog understanding device including: a sound collection module configured to collect a sound signal; a contextual processing module; and a dialog system configured to perform a dialog with a human, wherein the contextual processing module includes a plurality of layers for processing information obtained from the sound collection module, wherein a fallback processing module of a case where a predetermined process has not succeeded for the collected sound signal is provided on each layer of the plurality of layers, wherein a process of the next layer is performed after a fallback corresponding to a fallback process performed by the fallback processing module is performed, and wherein a sound signal obtained when the contextual processing module completes a process is input to the dialog system.

(2) In the above-described aspect (1), the contextual processing module may textualize the sound signal by performing the predetermined process on the collected sound signal, detect an entity that is a proper noun from a phrase obtained in a textualization process, and estimate utterance intent of a speaker by understanding the phrase obtained in the textualization process using a language model.

(3) In the above-described aspect (1) or (2), the number of layers may be three, a first layer may include an audio trigger module configured to detect a wake-up word and a sound module configured to perform a sound source localization process and a sound source separation process, a second layer may include an automatic speech recognition (ASR) module configured to convert speech into text with respect to a sound signal of a processing result of the first layer; a speaker recognition module configured to perform a speaker diarization process for identifying a speaker from an audio stream; a model adaptation module configured to perform speech-to-text model adaptation corresponding to a context-specific input; and a language detection module configured to detect a type of language recognized with reference to a language model provided in the language detection module, and a third layer may include a sentence processing module configured to classify a type of sentence obtained in a textualization process in the second layer; and a sentence determination module configured to detect a type of entity from the sentence obtained in the textualization process.

(4) In the above-described aspect (3), a first fallback processing module for the first layer may ignore a speech input until a wake-up word is detected, a second fallback processing module for the second layer may ignore a sound signal input as noise when a speech recognition process is disabled in the second layer, perform a predetermined reaction when a change in a speaker has been detected in the second layer, dynamically switch a language when a spoken language of the speaker is supported in the second layer, and provide a notification to the speaker when the speaker is speaking in an unsupported language, and a third fallback processing module for the third layer may insert a specific reaction when an expected question is received, insert a specific reaction when an unexpected question is received, and ask a follow-up question when an entity required for a sentence of the speaker has not been detected.

(5) In the above-described aspect (3), the dialog understanding device may include an imaging module configured to capture an image of the speaker, wherein the third layer may include a spatial and visual module configured to perform matching of a sound source azimuth with a tracked person location using the captured image, track movement of a mouth of the speaker, and perform a gaze direction estimation process for ascertaining a conversation of the speaker with the dialog system, and wherein a first fallback processing module for the first layer may ignore the speech as noise when a sound source direction of the speaker does not spatially match a person detected from the captured image, ignore the speech as noise when the movement of the mouth of the speaker has not been detected from the captured image, and ignore the speech as noise when the speaker is looking at someone else or is not looking at the dialog system.

(6) In any one of the above-described aspects (1) to (5), when the contextual processing module performs learning, system information may be input from the dialog system to the contextual processing module at the first time and understanding or context of different levels may be constructed on the basis of a data structure and another request at the second time.

(7) According to an aspect of the present invention, there is provided a dialog understanding method for use in a dialog understanding device including a sound collection module, a contextual processing module, and a dialog system, wherein the contextual processing module includes a plurality of layers for processing information obtained from the sound collection module, wherein a fallback processing module of a case where a predetermined process has not succeeded for the collected sound signal is provided on each layer of the plurality of layers, wherein the sound collection module collects a sound signal, wherein the dialog system performs a dialog with a human, wherein the contextual processing module performs a process of the next layer after a fallback corresponding to a fallback process performed by the fallback processing module is performed, and wherein the contextual processing module inputs a sound signal obtained when the contextual processing module completes a process to the dialog system.

According to the above-described aspects (1) to (7), it is possible to detect an abnormality that is likely to corrupt an input to a dialog system.

BRIEF DESCRIPTION OF THE DRAWINGS

FIG. 11 is a diagram showing an example of a fallback process at a first level according to the embodiment.

FIG. 12 is a diagram showing an example of a fallback process at a second level according to the embodiment.

FIG. 13 is a diagram showing an example of a fallback process at a third level according to the embodiment.

DETAILED DESCRIPTION OF THE INVENTION

Figure 1:
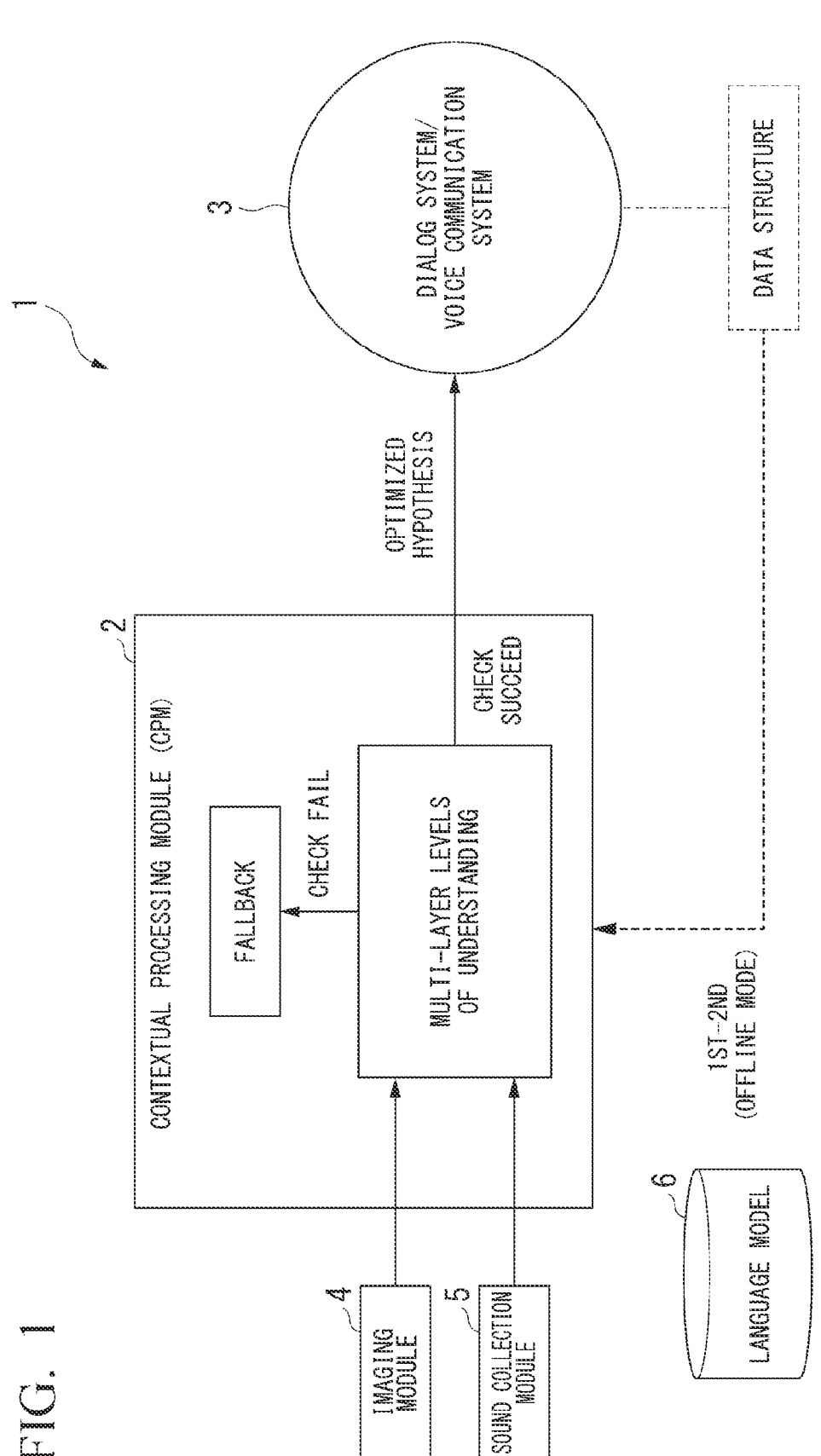
FIG. 1 is a diagram schematically showing a process in an embodiment.

Hereinafter, embodiments of the present invention will be described with reference to the drawings. Also, in the drawings used for the following description, the scales of respective members may have been appropriately changed to make each member have a recognizable size.

In all the drawings for describing the embodiments, components having the same function are denoted by the same reference signs and redundant descriptions thereof will be omitted.

In the present application, the term "based on XX" indicates "based on at least XX" and includes cases based on another element in addition to "XX." In addition, the term "based on XX" is not limited to cases in which "XX" is directly used, and also includes cases based on "XX" on which calculation or processing has been performed. "XX" may be any element (for example, any information).

(Outline of Process)

First, a process in the present embodiment will be schematically described.

FIG. 1 is a diagram schematically showing the process in the present embodiment. As shown in FIG. 1, a robot 1 includes, for example, a contextual processing module 2, a dialog system 3, an imaging module 4, a sound collection module 5, and a language model 6.

The robot 1 is an example of a dialog understanding device and is, for example, a communication robot.

The language model 6 includes a model that is a probability distribution for a sequence of words for each language (for example, Japanese, English, French, German, Chinese, or the like).

An image captured by the imaging module 4 and a sound signal captured by the sound collection module 5 are input to the contextual processing module 2. At the first time when information is input twice from the dialog system 3 to the contextual processing module 2, system information is loaded from the dialog system 3 to the contextual processing module 2. At the second time, the contextual processing module 2 constructs understanding and context of different levels on the basis of a data structure and another request. The contextual processing module 2 performs its own learning in these two processes. This learning process is performed offline. A process other than these processes is performed online.

The system information refers to the capabilities of a system, and is, for example, information about what commands and tasks are supported. The data structure is a format that allows a system to accept or reject information and react appropriately according to how information is analyzed and stored. Other requirements are elements that can be freely added to the system and used to accept, reject, or react. For example, if a new source is added, new requirements related to the new source can be freely created.

The contextual processing module 2 performs a predetermined process on the image captured by the imaging module 4 and the sound signal collected by the sound collection module 5 to understand utterance content, and outputs sound data created on the basis of a processing result to the dialog system 3. By looking at various modalities at different levels, the contextual processing module 2 utilizes the modalities to perform more robust and interactive corrections and generates an optimal input to the dialog system 3 in the dialog system. The contextual processing module 2 performs a failure check and performs a fallback process in the case of a failure, and each process will be described below.

The imaging module 4 is, for example, a red, green, and blue (RGB) camera. The imaging module 4 may be an RGBD camera that can obtain depth information D. Imaging time information (timestamp) is added to the captured image.

The sound collection module 5 is, for example, a microphone array composed of M (M is an integer of two or more) microphones. Sound-collection time information (timestamp) is added to the collected sound signal.

The dialog system 3 includes, for example, a speaker, an image display module, and the like. The dialog system 3 performs a dialog with the speaker on the basis of the information output by the contextual processing module 2.

The configuration shown in FIG. 1 is an example and a schematic configuration, and the configuration is not limited thereto.

(Example of Configuration of Contextual Processing Module and Example of Processing Procedure Thereof)

Figure 2:
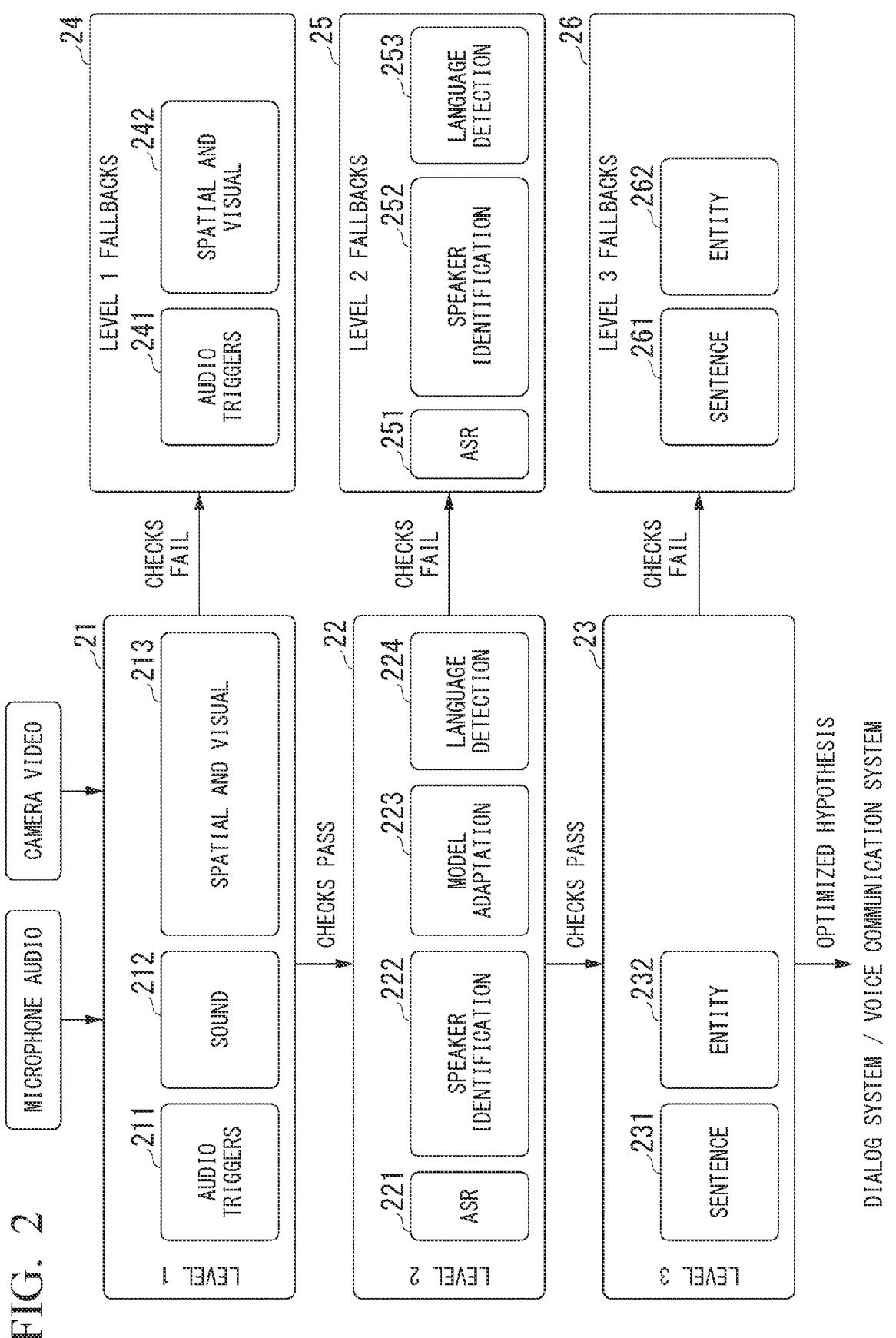
FIG. 2 is a diagram showing an overview of an example of a configuration of a contextual processing module and an example of a processing procedure thereof according to the embodiment.
Figure 3:
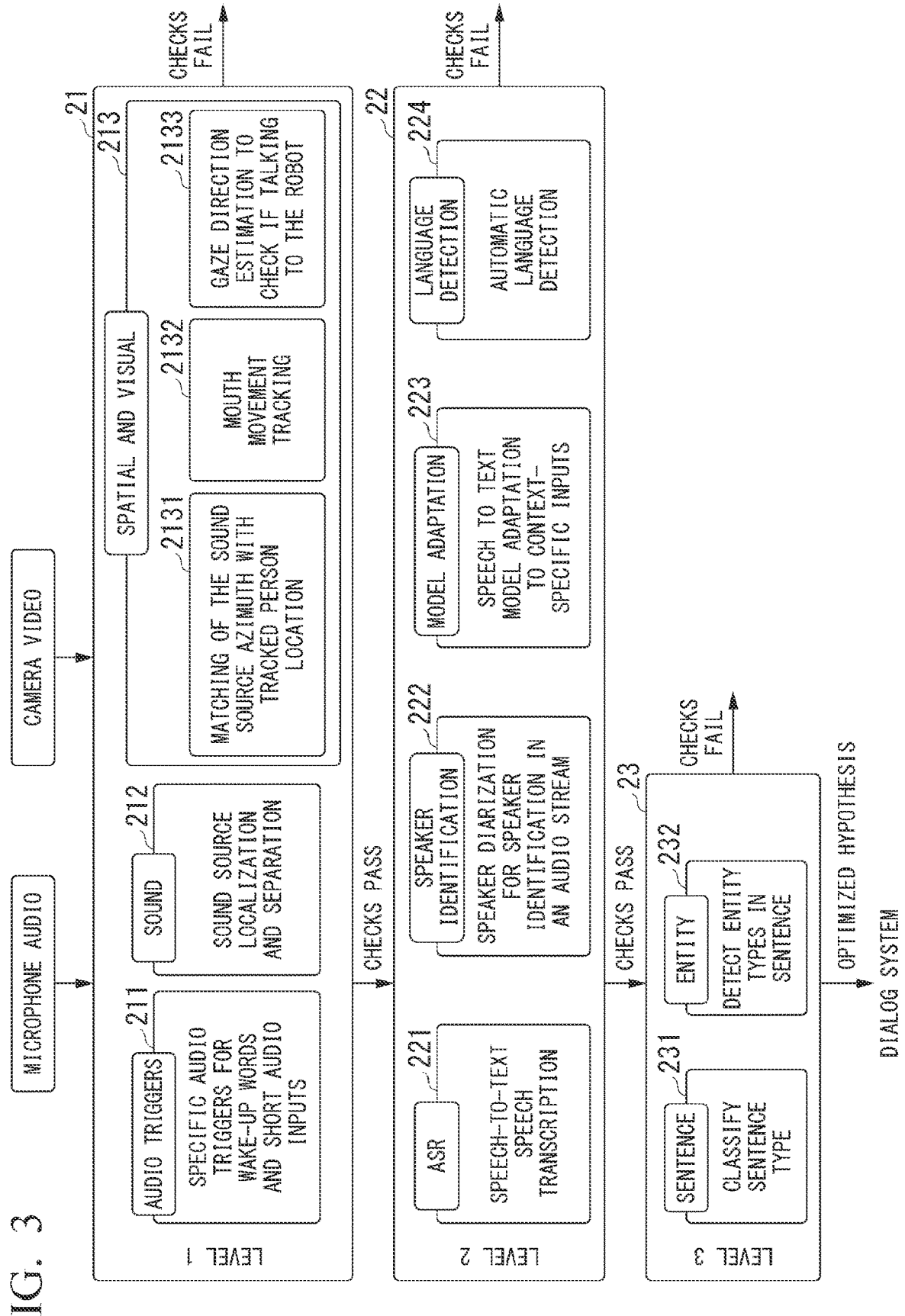
FIG. 3 is a diagram showing an example of a configuration of each part of FIG. 2 and an example of a process thereof.
Figure 4:
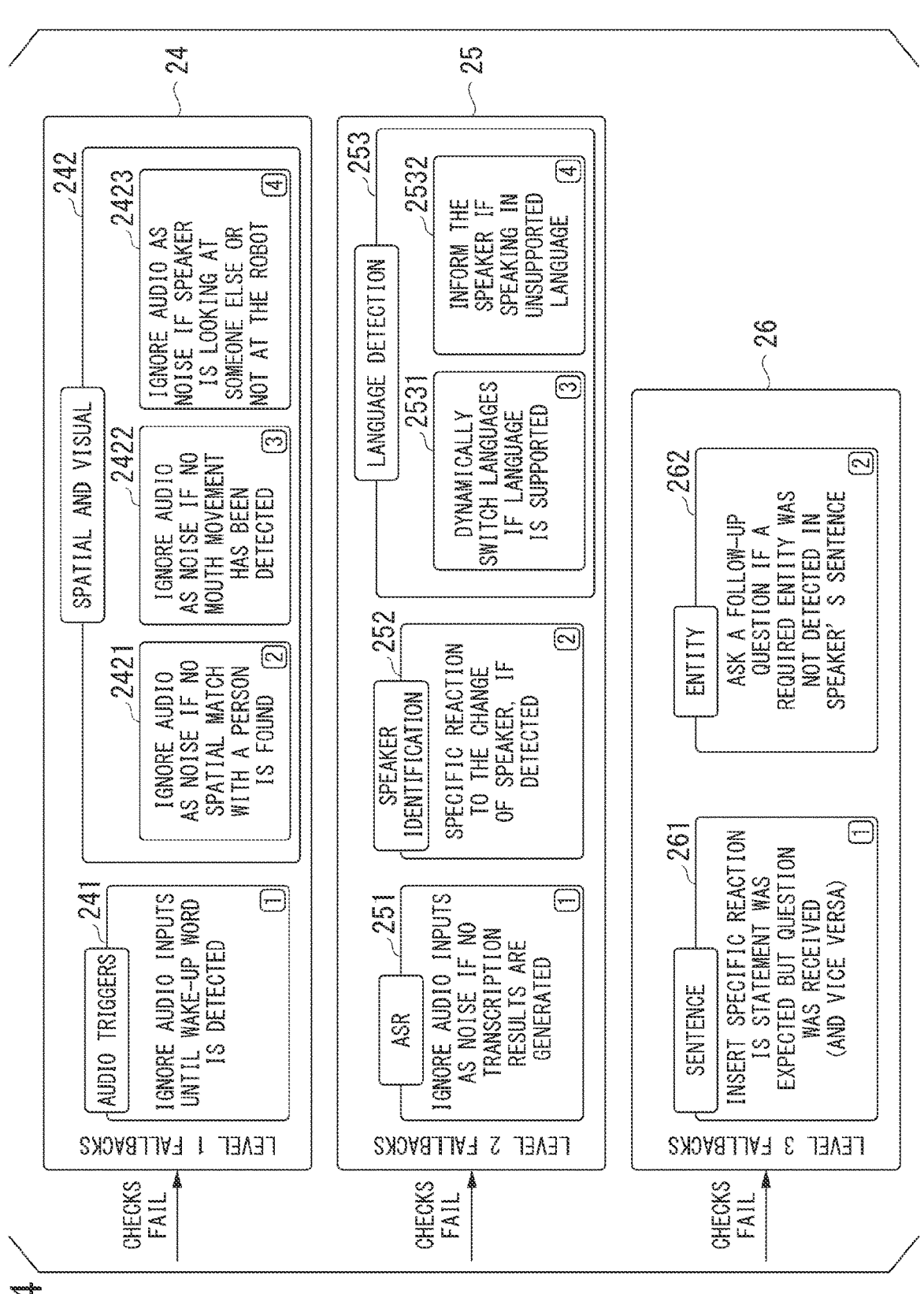
FIG. 4 is a diagram showing an example of a configuration of each fallback module in FIG. 2 and an example of a process thereof.

Next, an example of a configuration of the contextual processing module 2 and an example of a processing procedure thereof will be described with reference to FIGS. 2 to 4. FIG. 2 is a diagram showing an overview of the example of the configuration of the contextual processing module and the example of the processing procedure according to the present embodiment. FIG. 3 is a diagram showing an example of a configuration of the processing module of FIG. 2 and an example of a process thereof. FIG. 4 is a diagram showing an example of a configuration of each fallback module (fallback processing module) of FIG. 2 and an example of a process thereof.

As shown in FIGS. 2 to 4, the contextual processing module 2 performs processes of three levels (Levels 1 to 3). The contextual processing module 2 performs a failure check for each level, moves to the next level process when it is not determined to be a failure, and performs a fallback process for each level when it is determined to be a failure.

I. First Processing Module (First Layer)

The collected sound signal and the captured image are input to the first processing module 21 corresponding to level 1. The first processing module 21 includes an audio trigger module 211, a sound module 212, and a spatial and visual module 213. When it is determined that the check result of each part is not a failure, the first processing module 21 outputs information associated with the information detected or extracted by each part of the first processing module 21 to the second processing module 22. When an error occurs in the detection or extraction process of each part, the first processing module 21 outputs error information to the first fallback module 24. As shown in FIG. 1, the first processing module 21 and the first fallback module 24 are paired and perform the process in cooperation.

The audio trigger module 211 detects a specific audio trigger for a wake-up word or a short speech input. The wake-up word is a predetermined word or phrase, such as "Hey robot!". Alternatively, the wake-up word may be, for example, a sound signal of a predetermined volume and a predetermined time period or more.

The sound module 212 performs a sound source location identification and separation process.

The spatial and visual module 213 includes three modules. The first module 2131 performs matching of a sound source azimuth with a tracked person location. The second module 2132 tracks the movement of the speaker's mouth. The third module 2133 performs a gaze direction estimation process for ascertaining a conversation between the robot 1 and the speaker.

II. Second Processing Module (Second Layer)

Detected or extracted and associated information is input from the first processing module 21 to the second processing module 22 corresponding to level 2. The second processing module 22 includes an ASR module 221, a speaker identification module 222, a model adaptation module 223, and a language detection module 224. When it is determined that the check result of each part is not a failure, the second processing module 22 outputs information associated with the information detected or extracted by the second processing module to the third processing module 23. When an error occurs in the detection or extraction process of each part, the second processing module 22 outputs error information to the second fallback module 25. As shown in FIG. 1, the second processing module 22 and the second fallback module 25 are paired and perform the process in cooperation.

The ASR module 221 converts a speech-to-text conversion process for a sound signal of a processing result of the first processing module 21.

The speaker identification module 222 performs a speaker diarization process for identifying a speaker from an audio stream. The speaker diarization process is a process of estimating "when and who spoke" for a sound signal in which a speaker or the number of speakers is unknown.

The model adaptation module 223 performs adaptation of a speech-to-text model (speech-to-text conversion) corresponding to a context-specific input.

The language detection module 224 performs, for example, syntactic analysis for text obtained in a textualization process, and further detects what language is recognized with reference to the language model 6.

III. Third Processing Module (Third Layer)

Detected or extracted and associated information is input from the second processing module 22 to the third processing module 23 corresponding to level 3. The third processing module 23 includes a sentence processing module 231 and a sentence determination module 232. When it is determined that a check result of each part is not a failure, the third processing module 23 outputs information associated with the information detected or extracted by the third processing module 23 to the dialog system 3. When an error occurs in the detection or extraction process of each part, the third processing module 23 outputs error information to the third fallback module 26. As shown in FIG. 1, the third processing module 23 and the third fallback module 26 are paired and perform the process in cooperation.

The sentence processing module 231 classifies types of sentences obtained in a textualization process.

The sentence determination module 232 detects a type of entity in the sentence. An entity is a known proper noun or the like.

IV. First Fallback Processing Module

When the first processing module 21 determines that the check result is a failure, information indicating that an error has occurred during the detection or extraction process of each part of the first processing module 21 is input from the first processing module 21 to the first fallback module 24 corresponding to the first level. The first fallback module 24 includes an audio trigger module 241 and a spatial and visual module 242.

The audio trigger module 241 ignores a speech (audio) input until a wake-up word is detected.

The spatial and visual module 242 includes three modules. The first module 2421 ignores the speech as noise if the speaker's sound source direction and the person detected from the captured image do not spatially match. The second module 2422 ignores the speech as noise when no movement of the person's mouth has been detected. The third module 2423 ignores the speech as noise when the speaker is looking at someone else or is not looking at the robot 1.

When the second processing module 22 determines that the check result is a failure, information indicating that an error has occurred during the detection or extraction process of each part of the second processing module 22 is input from the second processing module 22 to the second fall-back module 25 corresponding to the second level. The second fallback module 25 includes an ASR module 251, a speaker identification module 252, and a language detection module 253.

When a speech recognition process cannot be performed, the ASR module 251 ignores the input sound signal as noise.

The speaker identification module 252 performs a specific reaction when a change in a speaker has been detected. The specific reaction is a predetermined process and is a process of greeting a changed speaker or the like.

The language detection module 253 includes two modules. A first module 2531 dynamically switches languages when the speaker's speaking language is supported. A second module 2532 provides a notification to the speaker when the speaker is speaking in an unsupported language.

When the third processing module 23 determines that the check result is a failure, information indicating that an error has occurred during the detection or extraction process of each part of the third processing module 23 is input from the third processing module 23 to the third fallback module 26 corresponding to the third level. The third fallback module 26 includes a sentence processing module 261 and a sentence determination module 262.

When an expected question has been received, the sentence processing module 261 inserts a specific reaction. Alternatively, when an unexpected question has been received, the sentence processing module 261 inserts a specific reaction.

The sentence determination module 262 asks a follow-up question when the entity required for the speaker's sentence has not been detected. The follow-up question is a question for extracting a necessary entity, and is, for example, a question such as "What did you do and how did you do it?" based on a verb in the included sentence.

(Example of Dialog Between Dialog System and Person)

Next, an example of a dialog between a dialog system and a human and an example of a process at the time of a dialog will be described with reference to FIGS. 5 to 7.

Figure 5:
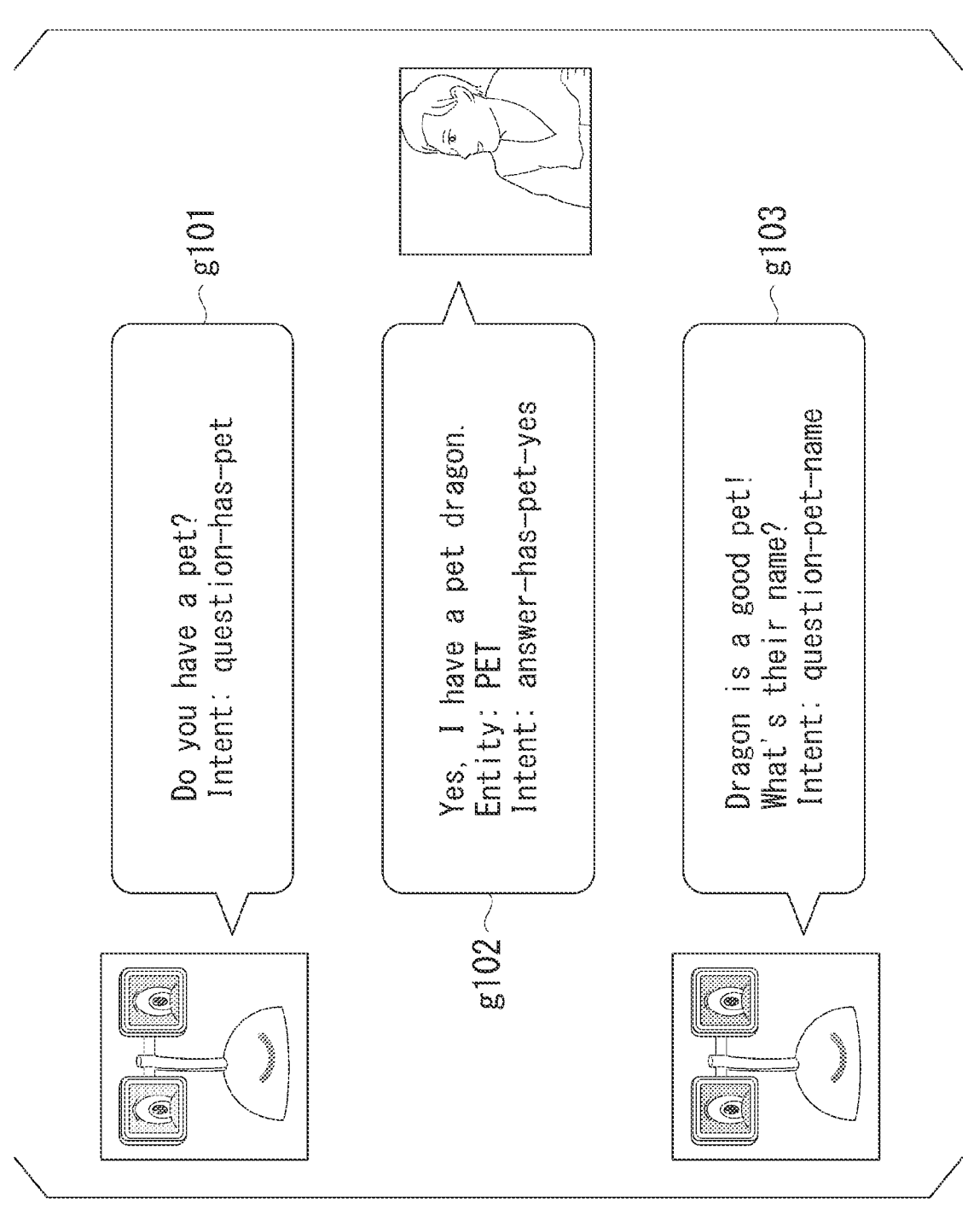
FIG. 5 is a diagram showing a first example of a dialog between a dialog system and a human.

FIG. 5 is a diagram showing a first example of a dialog between a dialog system and a human. The dialog examples of FIGS. 5 to 7 are dialog examples after wake-up word detection.

First, the dialog system 3 utters "Do you have a pet?." The intent of this utterance is "question," "has," and "pet" (g101).

It is assumed that a textualization result of the contextual processing module 2 after speech recognition of the speaker's utterance is "Yes, I have a pet dragon." In this utterance, the contextual processing module 2 understands that "dragon" is a type of "pet" and an entity. Also, the contextual processing module 2 understands the intent of this utterance as "reply," "has," "pet," and "yes" (g102).

On the basis of the output of the contextual processing module 2, the dialog system 3 outputs a sound signal of "Dragon a good pet! What's their name?." The intent of this utterance is "question," "pet" and "name" (g103).

Figure 6:
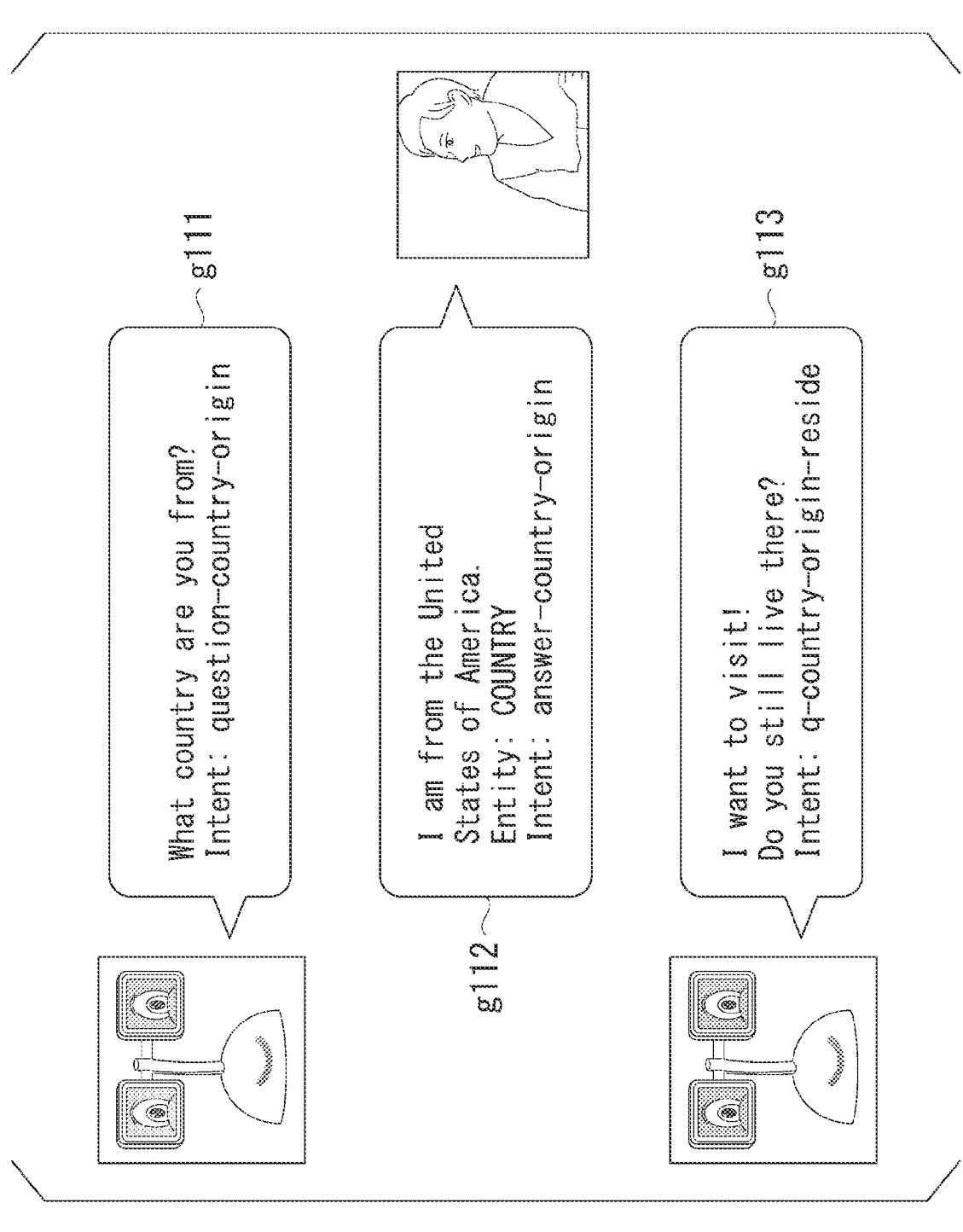
FIG. 6 is a diagram showing a second example of a dialog between a dialog system and a human.

FIG. 6 is a diagram showing a second example of a dialog between a dialog system and a human.

First, the dialog system 3 utters "What country are you from?" The intent of this utterance is "question," "country," and "origin" (g111).

It is assumed that a textualization result of the contextual processing module 2 after speech recognition of the speaker's utterance is "I am from the United States of America." In this utterance, the contextual processing module 2 understands that "the United States of America" is a type of "country" and an entity. Also, the contextual processing module 2 understands the intent of this utterance as "reply," "country," and "origin" (g112).

On the basis of the output of the contextual processing module 2, the dialog system 3 outputs a sound signal of "I want to visit! Do you still live there?." The intent of this utterance is "question," "country," "origin," and "reside" (g113).

Figure 7:
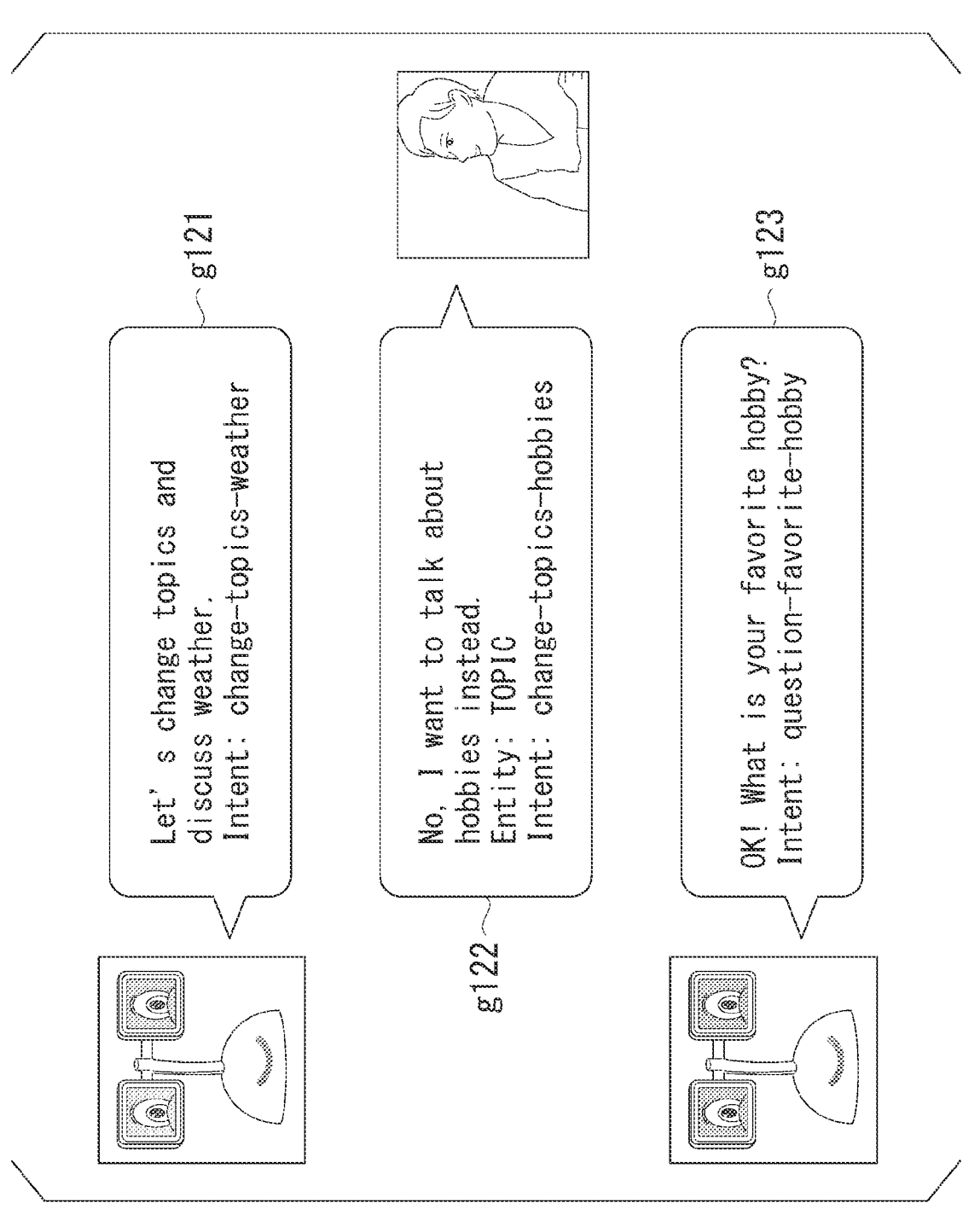
FIG. 7 is a diagram showing a third example of a dialog between a dialog system and a human.

FIG. 7 is a diagram showing a third example of a dialog between a dialog system and a human.

First, the dialog system 3 utters "Let's change topics and discuss weather?." The intent of this utterance is "questions," "topics," and "weather" (g121).

It is assumed that a textualization result of the contextual processing module 2 after speech recognition of the speaker's utterance is "No, I want to talk about hobbies instead." In this utterance, the contextual processing module 2 understands that "hobbies" is a "topic" and an entity. Also, the contextual processing module 2 understands the intent of this utterance as "change," "topics," and "hobbies" (g122).

On the basis of the output of the contextual processing module 2, the dialog system 3 outputs a sound signal of "OK! What is your favorite hobby?." The intent of this utterance is "question," "favorite," and "hobby" (g123).

Examples of the dialog and examples of understanding results shown in FIGS. 5 to 7 are examples and the present invention is not limited thereto.

(First-Level Process)

Figure 8:
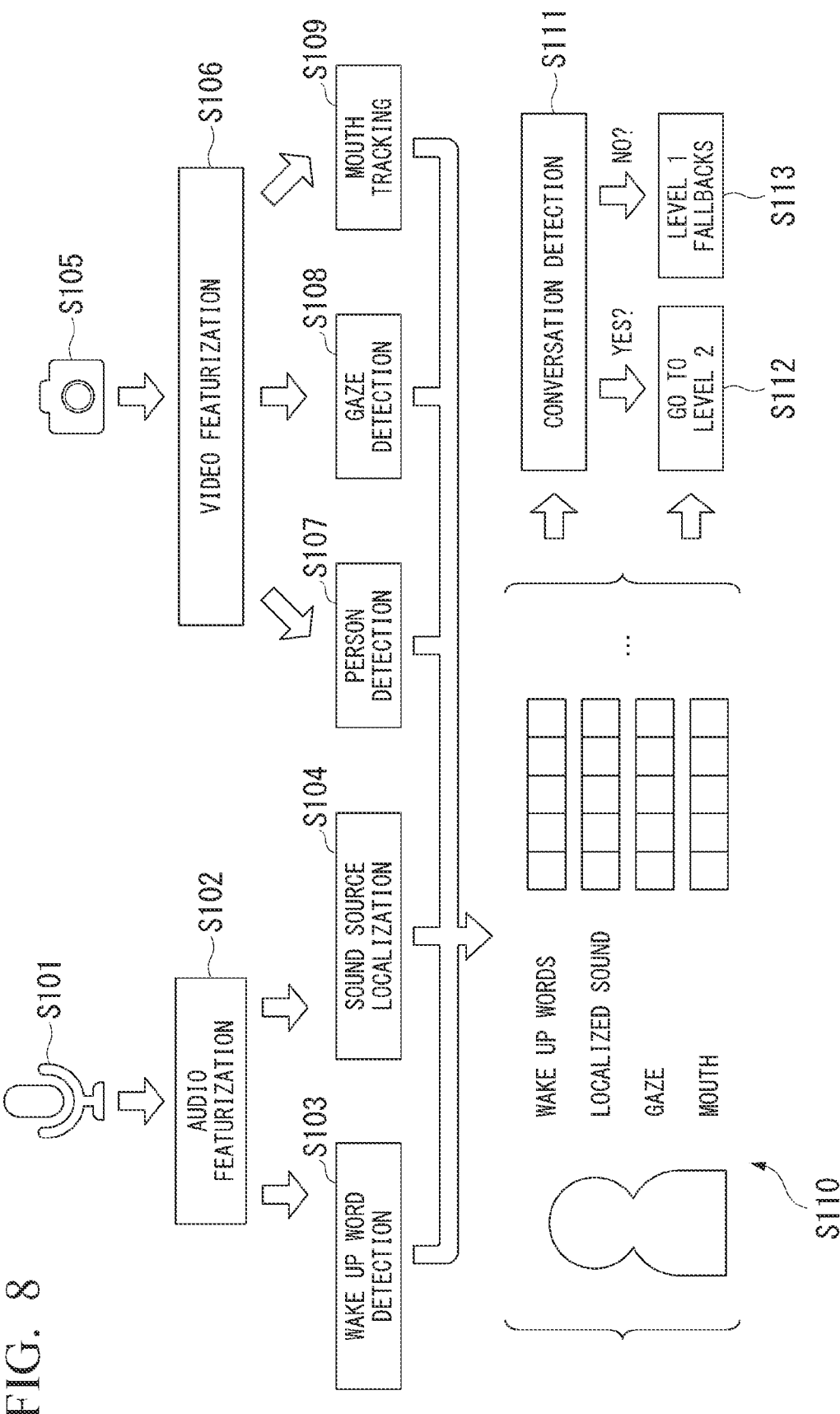
FIG. 8 is a diagram showing a first-level processing example according to the embodiment.

Next, a first-level process will be further described with reference to FIG. 8. FIG. 8 is a diagram showing an example of the first-level process according to the present embodiment. Although an example in which the number of speakers is one will be described in the example of the following process, the number of speakers may be two or more. In this case, the process is performed by detecting that the speaker has been changed on the way.

(Step S101) The sound collection module 5 collects the speaker's sound signal.

(Step S102) The first processing module 21 of the contextual processing module 2 converts the collected sound signal from an analog signal into a digital signal and extracts an acoustic feature quantity from the digital signal after the conversion in a well-known method. Acoustic feature quantities are, for example, a mel spectrum and a mel-frequency cepstral coefficient (MFCC).

(Step S103) The audio trigger module 211 of the first processing module 21 performs a speech recognition process (syntactic analysis may not be performed) using a sound signal and an acoustic feature quantity, converts a speech into text, and detects the presence or absence of a wake-up word from the text.

(Step S104) The sound module 212 of the first processing module 21 performs a sound source localization process and a sound source separation process for the sound signal and the acoustic feature quantity using, for example, a beamforming method or the like.

(Step S105) The imaging module 4 images the speaker.

(Step S106) The first processing module 21 converts a captured image from an analog signal into a digital signal, and extracts an image feature quantity from the digital signal after the conversion in a well-known method. Image feature quantities include, for example, a local image feature quantity, contour information of a face or body, and the like.

(Step S107) The spatial and visual module 213 of the first processing module 21 extracts a name in the case of a person in registered data with reference to a database of a feature quantity of each person registered in the spatial and visual module 213 or an external module with respect to the extracted image feature quantity and determines that an unregistered person is not registered.

(Step S108) The spatial and visual module 213 of the first processing module 21 extracts the speaker's gaze in a well-known method on the basis of the image feature quantity. The first processing module 21 may track the movement of the gaze.

(Step S109) The spatial and visual module 213 of the first processing module 21 tracks the movement of the speaker's mouth in a well-known method on the basis of the image feature quantity.

(Step S110) The first processing module 21 associates a wake-up word, a sound source localization result (including an acoustic signal), gaze-related information, and mouth-related information detected or extracted in steps S103, S104, S107, S108, and S109.

(Step S111) The first processing module 21 determines whether or not the speaker has performed an utterance for a dialog on the basis of the associated information.

(Step S112) When the first processing module 21 determines that the speaker has performed the utterance for the dialog, the process moves to a second-level process. The first processing module 21 outputs information associated with the information detected or extracted at the first level to the second processing module 22 at the second level.

(Step S113) When the first processing module 21 determines that the speaker has not performed an utterance for the dialog, the process moves to a first-level fallback process.

The above-described processing order and processing content are examples and are not limited thereto. For example, a process for an acoustic signal and a process for an image may be reversed or may be performed simultaneously.

(Second-Level Process)

Figure 9:
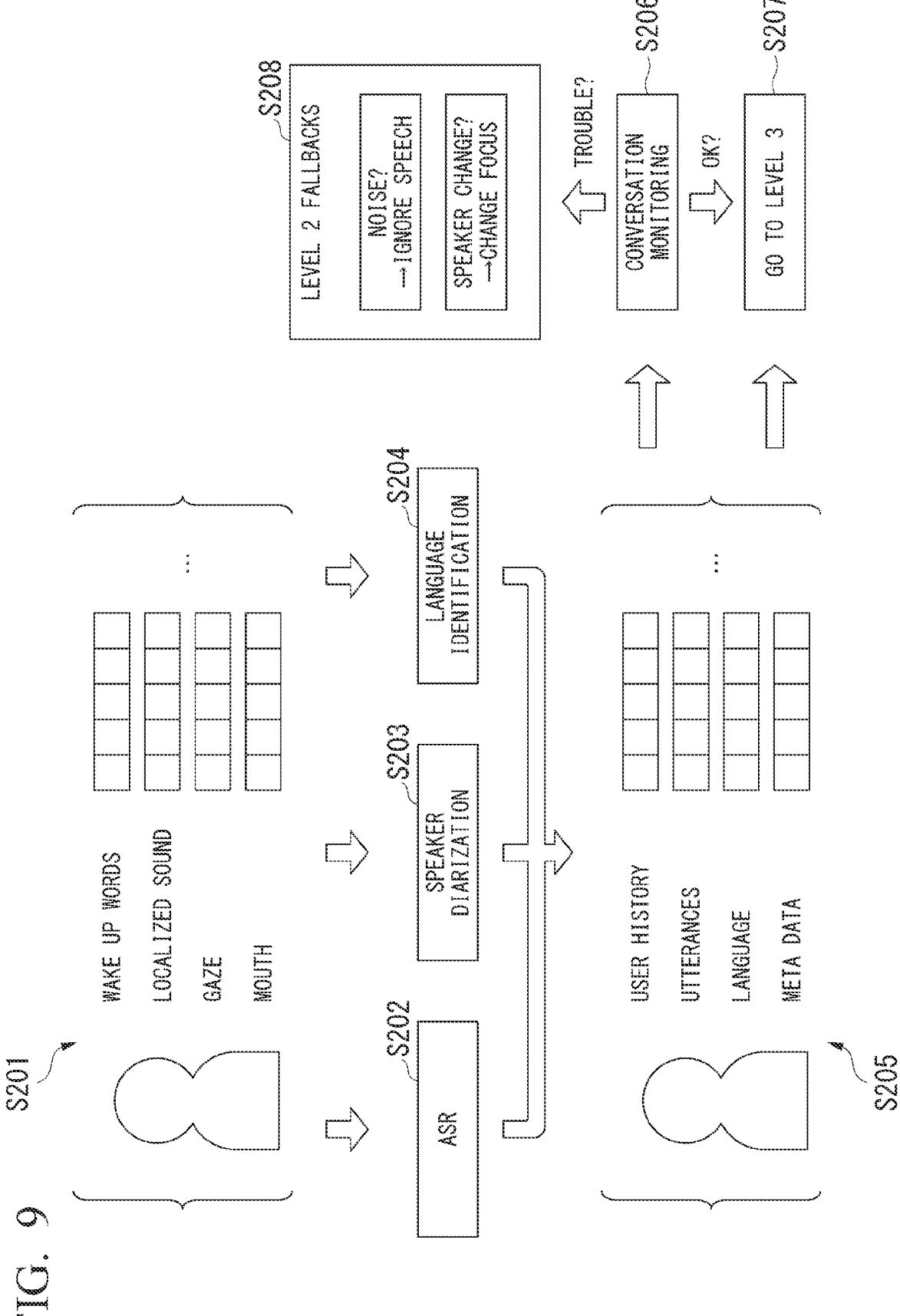
FIG. 9 is a diagram showing a second-level processing example according to the embodiment.

Next, a second-level process will be further described with reference to FIG. 9. FIG. 9 is a diagram showing an example of the second-level process according to the present embodiment. Although an example in which the number of speakers is one will be described in the example of the following process, the number of speakers may be two or more. In this case, the process is performed by detecting that the speaker has been changed on the way.

(Step S201) The second processing module 22 of the contextual processing module 2 acquires information associated with a wake-up word, a sound source localization result (including an acoustic signal), gaze-related information, and mouth-related information from the first processing module 21.

(Step S202) The ASR module 221 of the second processing module 22 performs a sound source separation process and an acoustic recognition process for the sound source localization result (including the acoustic signal) acquired from the first processing module 21, and converts the recognized sound signal into text. The second processing module 22 may perform a noise suppression process and an utterance segment detection process.

(Step S203) The speaker identification module 222 of the second processing module 22 performs a speaker diarization process.

(Step S204) The language detection module 224 of the second processing module 22 performs syntactic analysis on text obtained in a textualization process and further detects a type of language recognized with reference to the language model 6.

(step S205) The second processing module 22 associates an utterance history (USER HISTORY), utterances (UTTERANCES), language information (LANGUAGE), and meta data (META DATA) of the speaker detected or extracted in steps S202, S203, and S204. The utterance history is a history of utterances between the speaker and the robot 1 and may also include the history of utterances of dialogs that have been performed in the past. The meta data includes information such as the speaker's gaze information, the speaker's mouth movement, a sound signal of another speaker included in the collected sound signal, an image of another speaker included in the captured image, and the like.

(Step S206) The second processing module 22 monitors the extracted utterances. The second processing module 22 monitors, for example, a case where the utterance cannot be detected, a case where the language used for the utterance is switched, or the like.

(Step S207) When the second processing module 22 determines that no trouble (failure) has been detected as a monitoring result, the third-level process is performed. The second processing module 22 outputs information associated with utterance history (USER HISTORY), utterances (UTTERANCES), language information (LANGUAGE), and meta data (META DATA) of the speaker that have detected or extracted to the third processing module 23.

(Step S208) When the second processing module 22 determines that a trouble (failure) has been detected as a monitoring result, the process moves to a second-level fallback process. In the second-level fallback process, the second fallback module 25 determines that the language has changed or that it is noise instead of utterance and returns a determination result to the second processing module 22.

The above-described processing order and processing content are examples and are not limited thereto. For example, the processing order of steps S202 to S204 may be swapped and may be performed simultaneously.

(Third-Level Process)

Figure 10:
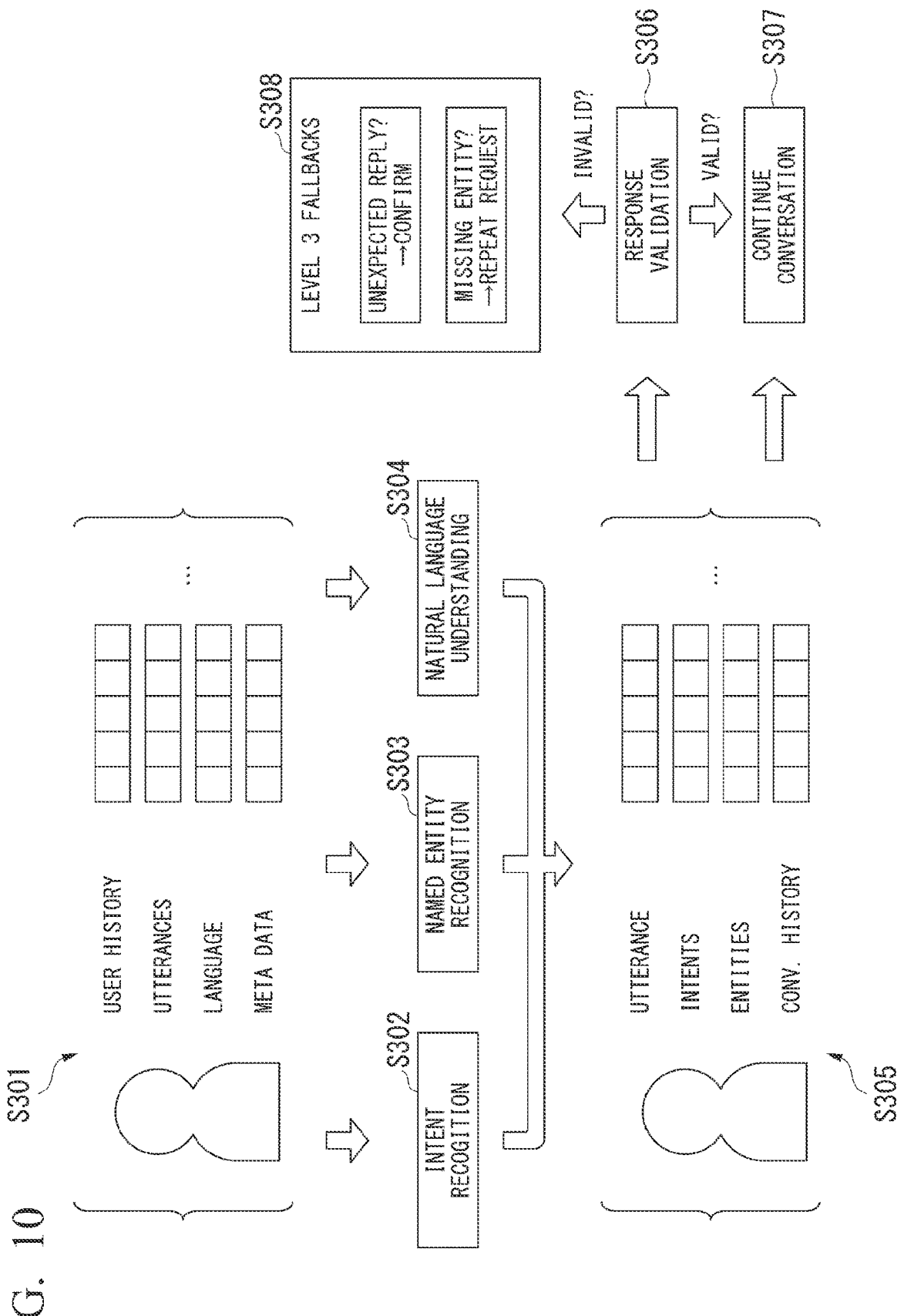
FIG. 10 is a diagram showing a third-level processing example according to the embodiment.

Next, a third-level process will be further described with reference to FIG. 10. FIG. 10 is a diagram showing an example of the third-level process according to the present embodiment. Although an example in which the number of speakers is one will be described in the example of the following process, the number of speakers may be two or more. In this case, the process is performed by detecting that the speaker has been changed on the way.

(Step S301) The third processing module 23 of the contextual processing module 2 acquires information associated with an utterance history of the speaker, the utterances, language information, and meta data of the speaker that have been detected or extracted from the second processing module 22.

(Step S302) The sentence processing module 231 of the third processing module 23 classifies a type of sentence after a textualization process. Thereby, the sentence processing module 231 estimates the intent (INTENT) of the utterance.

(Step S303) The sentence determination module 232 of the third processing module 23 detects a type of entity in the sentence.

(Step S304) The third processing module 23 understands the acquired utterances of the speaker on the basis of detection, extraction, and determination results at the first to third levels.

(Step S305) The third processing module 23 associates utterances (UTTERANCES), intents (INTENTS), proper noun information (ENTITIES), and dialog history (CONV. HISTORY) that have been extracted or detected.

(Step S306) The third processing module 23 determines, for example, whether or not an utterance corresponding to the utterance uttered by the dialog system 3 has been obtained, i.e., whether or not a dialog is valid.

(Step S307) The third processing module 23 continues the dialog when the dialog is valid.

(Step S308) When the dialog is not valid, the third processing module 23 moves the process to the third fallback process at the third level. For example, when the utterance uttered by the dialog system 3 is different from the speaker's utterance intent, the third fallback module 26 makes a change to the utterance of a theme that matches the speaker's intent, or issues an instruction to perform a process of asking a question again or the like in the case of an unexpected response.

(Example of Fallback Process During First-Level Sentence Analysis Process)

Next, an example of a fallback process at the first level will be described. FIG. 11 is a diagram showing the example of the fallback process at the first level according to the present embodiment. In the example shown in FIG. 11, a "fallback number," description of the fallback (hereinafter referred to as "description"), a system prompt, a specific action, and other details (hereinafter referred to as "fallbacks") are shown.

I. First Fallback

Description; It is a fallback that ignores a speech input until a wake-up word is detected.

Fallback; The system is assumed to ignore all speech inputs other than a preset wake-up word.

II. Second Fallback

Description; When a spatial match with a person cannot be ascertained, the speech is ignored as noise.

Fallback; When the system cannot ascertain that the sound is coming from a direction in which a human is present, the system should ignore all speech inputs as noise. The person should be tracked using a dedicated skeletal tracking depth camera.

III. Third Fallback

Description; When mouth movement is not detected, the speech is ignored as noise.

Fallback; When a person's face is visible and no mouth movement is detected, the system ignores any speech input from that person as background noise. By using this method, a system resistant to the background noise coming from behind the person is implemented.

IV. Fourth Fallback

Description; When the speaker is not looking at someone else or the robot (the dialog system 3), the speech is ignored as noise.

Fallback; When it can be spatially ascertained that the speaker is talking to another person (for example, another person in the room), the system shall ignore all speech inputs from the specific person.

(Example of Fallback Process During Second-Level Sentence Analysis Process)

Next, an example of the fallback process at the second level will be described. FIG. 12 is a diagram showing the example of the fallback process at the second level according to the present embodiment.

I. First Fallback

Description; A speech input that doesn't generate text is ignored as noise.

Fallback; The system shall ignore all speech inputs that cannot generate valid text as noise.

II. Second Fallback

Description; There is a specific reaction of a case where a change in a speaker is detected.

Fallback; When the speaker has changed, the system shall recognize that the change has been detected.

For example, it can "face" a new speaker or something like "Nice to hear your input as well" is added to a generated reply.

III. Third Fallback

Description; The language is dynamically switched when the language is switched and the switched language is supported.

Fallback; Instead of resorting to default fallbacks, the system should be able to handle a speaker switching languages between speech inputs. Such an event can be acknowledged by a phrase in the previous language. For example, after the utterance such as "Oh, you want to switch to Spanish? Sure, I can do that," the dialog continues.

IV. Fourth Fallback

Description; A notification is provided to the speaker when the language is switched and the switched language is an unsupported language.

Fallback; When the speaker is using an unsupported language, the system should be able to detect it and suggest a switch to a supported language.

(Example of Fallback Process During Third-Level Sentence Analysis Process)

Next, an example of a fallback process at the third level will be described. FIG. 13 is a diagram showing the example of the fallback process at the third level according to the present embodiment.

I. First Fallback

Description; When an expected question has been received, a specific reaction is inserted. Alternatively, when an unexpected question has been received, a specific reaction is inserted.

Fallback; For example, when the system expects the speaker to speak, but instead receives a question, the system induces the speaker to answer the question.

II. Second Fallback

Description; A follow-up question is asked when a required entity has not been detected from a sentence obtained in a textualization process for the speaker's speech.

Fallback; When the intent of the system is to understand a value of an entity type and the value is necessary to continue the conversation, the system will ask follow-up questions and try to extract the missing entity.

The contextual processing module 2 does not perform all of the corresponding fallbacks shown in FIGS. 11 to 13, but performs necessary fallbacks according to the content of the failure. The descriptions and fallbacks shown in FIGS. 11 to 13 are examples and are not limited thereto.

Although an example in which an image captured by the imaging module 4 is used has been described in the above-described example, the contextual processing module 2 may not use an image. In this case, the contextual processing module 2 may not perform the detections of gaze and mouth movement of the speaker or the fallback processes associated with these detections.

Although an example in which the contextual processing module 2 performs a process using three levels (three layers) has been described, the number of levels (layers) may be two or more or may be four or more.

(Comparison with Conventional Technology)

A dialog system, which is a voice command processing system, is significantly effective when humans communicate with robots. Thereby, the robot can understand the command and execute the command appropriately. However, a conventional dialog system is highly dependent on the quality of the input of hypotheses from ASR (speech recognition). For example, when the hypothesis was corrupted or the other person's conversation style has not fitted the structure of the dialog input, the dialog system did not suitably function.

For this reason, in voice command communication used in conventional smart speakers, portable terminals, and the like, no system provides feedback related to the quality of the voice capture and the accuracy of the ASR text. The conventional technology also does not provide a fallback strategy for cases where the audio quality is poor or the audio transcription results are not satisfactory.

Such an approach may be justified for short single-spoken speech inputs, such as commands, because the cost of retries is low and it is a typical use case for voice assistants. However, in dialogs between humans and devices (smart speakers, portable terminals, robots, and the like), it is necessary not only to process short commands, but also to maintain long conversations.

On the other hand, in the present embodiment, in order to improve the quality of the hypothesis from the ASR before input to the dialog system 3, the hypothesis is preprocessed and interactive and iterative execution of context filtering is performed. This approach solves problems with corrupted hypotheses and the user's conversational style and can ensure optimized input for the dialog system to suitably perform by correcting these.

In the present embodiment, a multi-level fallback approach is used. Thereby, according to the present embodiment, a better experience can be provided universally for the end user. According to the present embodiment, the speaker can obtain more information about the understanding of the robot 1, helping to create a sense of machine intelligence that is not found in the device of the conventional technology.

Degrees of understanding at the first to third levels (see, for example, FIG. 2) are context checking and sanity checking of different levels to ascertain whether or not the input to the dialog system is correct. This takes in the data structure of the dialog system as an input and the contextual processing module 2 performs a process such as creating context checking of different levels, iterative and interactive queries, and the like in order to correct an incorrect input or freestyle input.

In the present embodiment, understanding of the speaker's utterance is performed at three levels. In addition, a fallback process is performed at each level.

In the present embodiment, the audiovisual modality can be used to detect an abnormality that is likely to corrupt the input to the dialog system. According to the present embodiment, the correction of the input hypothesis for the dialog system is ensured using each modality according to fallbacks of three levels.

In the present embodiment, three understanding level hypotheses were preprocessed and context filtering was performed interactively and iteratively to improve the quality of hypotheses from the ASR module 221 before the input to the dialog system. This approach attempts to solve and fix problems with corrupted hypotheses and user conversation styles to ensure the optimized input so that the dialog system suitably operates.

In the present embodiment, a multimodal approach of the fallback mechanism is performed. This can provide a subsystem combination method that leads to a multimodal layer of fallback execution that ensures a more reliable input to the dialog system.

A program for implementing some or all functions of the contextual processing module 2 and the dialog system 3 in the present invention is recorded on a computer-readable recording medium, and the program recorded on the recording medium is read into a computer system and executed, such that all or some functions of the contextual processing module 2 and the dialog system 3 may be performed. The "computer system" used here is assumed to include an operating system (OS) or hardware such as peripheral devices. The "computer system" is also assumed to include a WWW system equipped with a homepage provision environment (or display environment). Also, the "computer-readable recording medium" refers to a flexible disk, a magneto-optical disc, a read-only memory (ROM), a portable medium such as a compact disc-ROM (CD-ROM), or a storage device such as a hard disk embedded in the computer system. Furthermore, the "computer-readable recording medium" is assumed to include a medium that holds a program for a certain period of time, such as a volatile memory (random-access memory (RAM)) inside a computer system serving as a server or a client when the program is transmitted via a network such as the Internet or a communication circuit such as a telephone circuit.

Also, the above-described program may be transmitted from a computer system storing the program in a storage device or the like to another computer system via a transmission medium or by transmission waves in a transmission medium. Here, the "transmission medium" for transmitting the program refers to a medium having a function of transmitting information, as in a network (communication network) such as the Internet or a communication circuit (communication line) such as a telephone circuit. Also, the above-described program may be a program for implementing some of the above-described functions. Further, the above-described program may be a so-called differential file (differential program) capable of implementing the above-described function in combination with a program already recorded on the computer system.

Although modes for carrying out the present invention have been described above using embodiments, the present invention is not limited to the embodiments and various modifications and substitutions can also be made without departing from the scope and spirit of the present invention.

What is claimed is:

1. A dialog understanding device comprising:
a sound collection module configured to collect a sound signal;
a contextual processing module; and
a dialog system configured to perform a dialog with a human,
wherein the contextual processing module comprises three layers for processing information obtained from the sound collection module, wherein a fallback processing module of a case where a predetermined process has not succeeded for the collected sound signal is provided on each layer of the three layers, wherein a process of the next layer is performed after a fallback corresponding to a fallback process performed by the fallback processing module is performed, wherein a sound signal obtained when the contextual processing module completes a process comprises input to the dialog system, wherein a first layer of the three layers comprises:

an audio trigger module configured to detect a wake-up word, and a sound module configured to perform a sound source localization process and a sound source separation process, wherein a second layer of the three layers comprises:

an automatic speech recognition module configured to convert speech into text with respect to a sound signal of a processing result of the first layer, a speaker recognition module configured to perform a speaker diarization process for identifying a speaker from an audio stream, a model adaptation module configured to perform speech-to-text model adaptation corresponding to a context-specific input, and a language detection module configured to detect a type of language recognized with reference to a language model provided in the language detection module, and wherein a third layer of the three layers comprises:

a sentence processing module configured to classify a type of sentence obtained in a textualization process in the second layer; and a sentence determination module configured to detect a type of entity from the sentence obtained in the textualization process.

2. The dialog understanding device according to claim 1, wherein the contextual processing module is configured to textualize the sound signal by:

performing the predetermined process on the collected sound signal to detect an entity that comprises a proper noun from a phrase obtained in a textualization process, and estimate utterance intent of a speaker by understanding the phrase obtained by the textualization process, using a language model.

3. The dialog understanding device according to claim 1, wherein a first fallback processing module for the first layer ignores is configured to ignore a speech input until a wake-up word is detected, wherein a second fallback processing module for the second layer is configured to:

ignore a sound signal input as noise when a speech recognition process is disabled in the second layer, perform a predetermined reaction when a change in a speaker has been detected in the second layer, dynamically switches switch a language when a spoken language of the speaker is supported in the second layer, and provide a notification to the speaker when the speaker is speaking in an unsupported language, and wherein a third fallback processing module for the third layer is configured to:

insert a first specific reaction when an expected question is received, insert a second specific reaction when an unexpected question is received, and ask a follow-up question when an entity required for a sentence of the speaker has not been detected.

4. The dialog understanding device according to claim 1, further comprising an imaging module configured to capture an image of the speaker, wherein the third layer further comprises a spatial and visual module configured to:

perform matching of a sound source azimuth with a tracked person location using the captured image, track movement of a mouth of the speaker, and perform a gaze direction estimation process for ascertaining a conversation of the speaker with the dialog system, and wherein a first fallback processing module for the first layer is configured to:

ignore the speech as noise when a sound source direction of the speaker does not spatially match a person detected from the captured image, ignore the speech as noise when the movement of the mouth of the speaker has not been detected from the captured image, and ignore the speech as noise when the speaker is looking at someone else or is not looking at the dialog system.

5. The dialog understanding device according to claim 1, wherein when the contextual processing module performs learning at least one of:

system information is input from the dialog system to the contextual processing module at a first time and understanding, or context of different levels is constructed on the basis of a data structure and another request at a second time.

6. A dialog understanding method for use in a dialog understanding device including:

a sound collection module, a contextual processing module, and a dialog system, wherein the contextual processing module comprises three layers for processing information obtained from the sound collection module, wherein a fallback processing module, of a case where a predetermined process has not succeeded for the collected sound signal, is provided on each layer of the three layers, wherein the sound collection module collects a sound signal, wherein the dialog system performs a dialog with a human, wherein the contextual processing module performs a process of the next layer after a fallback corresponding to a fallback process performed by the fallback processing module is performed, wherein the contextual processing module inputs a sound signal obtained when the contextual processing module completes a process to the dialog system, wherein a first layer of the three layers comprises:

an audio trigger module that detects a wake-up word, and a sound module that performs a sound source localization process and a sound source separation process, wherein a second layer of the three layers comprises:

an automatic speech recognition module that converts speech into text with respect to a sound signal of a processing result of the first layer, a speaker recognition module that performs a speaker diarization process for identifying a speaker from an audio stream, a model adaptation module that performs speech-to-text model adaptation corresponding to a context-specific input, and a language detection module that detects a type of language recognized with reference to a language model provided in the language detection module, and wherein a third layer of the three layers comprises:

a sentence processing module that classifies a type of sentence obtained in a textualization process in the second layer; and a sentence determination module that detects a type of entity from the sentence obtained in the textualization process.

* * * * *